US009880662B2

(12) United States Patent
Lu et al.

(10) Patent No.: US 9,880,662 B2
(45) Date of Patent: Jan. 30, 2018

(54) TOUCH DRIVING UNIT AND CIRCUIT, DISPLAY PANEL AND DISPLAY DEVICE

(71) Applicant: BOE Technology Group Co., Ltd., Beijing (CN)

(72) Inventors: Jianing Lu, Beijing (CN); Weixu Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/307,985

(22) PCT Filed: Mar. 28, 2016

(86) PCT No.: PCT/CN2016/077485
§ 371 (c)(1),
(2) Date: Oct. 31, 2016

(87) PCT Pub. No.: WO2016/165550
PCT Pub. Date: Oct. 20, 2016

(65) Prior Publication Data
US 2017/0068385 A1    Mar. 9, 2017

(30) Foreign Application Priority Data

Apr. 16, 2015   (CN) .......................... 2015 1 0182106

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
None
See application file for complete search history.

(56) References Cited

U.S. PATENT DOCUMENTS

2008/0133203 A1* 6/2008 Yang .................. G06F 17/5036
                                                                    703/14
2012/0117412 A1* 5/2012 Nakamura ................ G06F 5/08
                                                                    713/400

(Continued)

FOREIGN PATENT DOCUMENTS

| CN | 101604501 A | 12/2009 |
| CN | 104485082 A | 4/2015 |
| CN | 104777936 A | 7/2015 |

OTHER PUBLICATIONS

Jul. 4, 2016—International Search Report and Written Opinion Appn PCT/CN2016/077485 with Eng Tran.

*Primary Examiner* — Duane N Taylor, Jr.
(74) *Attorney, Agent, or Firm* — Banner & Witcoff, Ltd.

(57) ABSTRACT

The embodiments of the present disclosure provide a touch driving unit and circuit, a display panel and a display device. The touch driving unit comprises a shift control module, a selection module, a buffer module and an amplitude control module; the shift control module includes a start signal terminal, an output terminal and at least one clock signal terminal; the selection module includes a first input terminal, a second input terminal and an output terminal; the buffer module including an input terminal and an output terminal; and the amplitude control module including an input terminal and an output terminal. The embodiments of the present disclosure are used for display manufacturing.

10 Claims, 6 Drawing Sheets

(56) References Cited

U.S. PATENT DOCUMENTS

| | | | |
|---|---|---|---|
| 2015/0161954 A1* | 6/2015 | Tokita | G06F 3/0412 345/174 |
| 2016/0188049 A1* | 6/2016 | Yang | G06F 3/044 345/174 |
| 2016/0188091 A1* | 6/2016 | Sun | G06F 3/044 345/174 |

* cited by examiner

TOUCH DRIVING UNIT AND CIRCUIT, DISPLAY PANEL AND DISPLAY DEVICE

The application is a U.S. National Phase Entry of International Application No. PCT/CN2016/077485 filed on Mar. 28, 2016, designating the United States of America and claiming priority to Chinese Patent Application No. 201510182106.2 filed on Apr. 16, 2015. The present application claims priority to and the benefit of the above-identified applications and the above-identified applications are incorporated by reference herein in their entirety.

TECHNICAL FIELD

The present disclosure relates to the field of display technique, and more particularly to a touch driving unit and circuit, a display panel and a display device.

BACKGROUND

Since the In Cell technique (a technique that integrates a touch element to internal of a display panel) can enable a display panel to be integrated with a touch function, and make a module be thinner and have a higher transmittance, at present, more and more products begin to adopt an In Cell screen. Now, most of the manufacturers use the Hybrid In Cell technique (a hybrid touch technique), wherein in the Hybrid In Cell technique, an RX (a touch receiving electrode) layer is at an outer side of a color film substrate, a TX (a touch emitting electrode) layer is shared with a common electrode layer of a display panel.

The In Cell technique also has its own shortcomings, as to the IC (integrated circuit) alone, a touch driving circuit of the touch emitting electrode (TX) needs to be integrated into a driving IC, that is, it needs to fabricate an independent customized touch driving circuit of the TX on the driving IC. As a result, once an element in the touch driving circuit has a problem, the entire driving IC needs to be re-fabricated, which is not beneficial to cost control and hinders border slimming of the display panel.

SUMMARY

The embodiments of the present disclosure provide a touch driving unit and circuit, a display panel and a display device, which facilitate implementing border slimming of the display panel and can achieve effective cost control.

An aspect of the embodiments of the present disclosure provides a touch driving unit, comprising:

a shift control module, a selection module, a buffer module and an amplitude control module; the shift control module including a start signal terminal, an output terminal and at least one clock signal terminal; the selection module including a first input terminal, a second input terminal and an output terminal; the buffer module including an input terminal and an output terminal; the amplitude control module including an input terminal and an output terminal;

wherein the output terminal of the shift control module is connected to the first input terminal of the selection module; the second input terminal of the selection module is inputted with a touch time-shared control signal, the output terminal of the selection module is connected to the input terminal of the buffer module, the output terminal of the buffer module is connected to the input terminal of the amplitude control module; the output terminal of the amplitude control module is connected to a touch emitting electrode;

the shift control module is configured to generate, at the output terminal thereof, a shift register signal under the control of the start signal terminal and the at least one clock signal terminal;

the selection module is configured to output a high level signal or a low level signal in accordance with a combined action of the touch time-shared control signal and the shift register signal generated by the shift control module;

the buffer module is configured to convert a level of a signal outputted by the selection module to a level equal to a control signal at the input terminal of the amplitude control module; and the amplitude control module is configured to pull up or pull down an amplitude of a signal outputted by the buffer module, to generate a touch time-shared driving signal, and output the touch time-shared driving signal to the touch emitting electrode.

Optionally, the selection module comprises an AND gate circuit.

Optionally, the AND gate circuit comprises:

a first transistor, a first electrode of the first transistor being connected to a voltage terminal, a gate of the first transistor being inputted with the touch time-shared control signal, and a second electrode of the first transistor being connected to a gate of a fifth transistor;

a third transistor, a first electrode of the third transistor being connected to the second electrode of the first transistor, a gate of the third transistor being inputted with the touch time-shared control signal, and a second electrode of the third transistor being connected to a first electrode of a fourth transistor;

the fourth transistor, a gate of the fourth transistor being connected to the output terminal of the shift control module, and a second electrode of the fourth transistor being grounded;

a second transistor, a first electrode of the second transistor being connected to the voltage terminal, a gate of the second transistor being connected to the gate of the fourth transistor, and a second electrode of the second transistor being connected to the first electrode of the third transistor;

the fifth transistor, a first electrode of the fifth transistor being connected to the voltage terminal, a gate of the fifth transistor being connected to a gate of a sixth transistor, and a second electrode of the fifth transistor being connected to the output terminal of the selection module; and the sixth transistor, a first electrode of the sixth transistor being connected to the second electrode of the fifth transistor, and a second electrode of the sixth transistor being grounded.

Optionally, the first transistor, the second transistor and the fifth transistor belong to the same type of transistor;

the third transistor, the fourth transistor and the sixth transistor belong to the same type of transistor.

Optionally, the shift control module comprises a shift register.

Optionally, the buffer module comprises a first inverter and a second inverter, wherein an input terminal of the first inverter is connected to the output terminal of the selection module, and an output terminal of the first inverter is connected to an input terminal of the second inverter; and an output terminal of the second inverter is connected to the input terminal of the amplitude control module.

Optionally, the amplitude control module comprises:

a first level terminal, the first level terminal being connected to a first level;

a second level terminal, the second level terminal being connected to a second level;

a first diode, a cathode of the first diode being connected to the first level terminal, and an anode of the first diode being connected to the output terminal of the buffer module; and a second diode, an anode of the second diode being connected to the second level terminal, and a cathode of the second diode being connected to the output terminal of the buffer module.

Optionally, the amplitude control module pulls up an amplitude of a signal outputted by the buffer module according to the first level and pulls down an amplitude of a signal outputted by the buffer module according to the second level, so as to generate a touch time-shared driving signal, and output the touch time-shared driving signal to the touch emitting electrode.

Optionally, the amplitude control module comprises a transfer gate circuit.

Optionally, the amplitude control module comprises:

a first level terminal, the first level terminal being connected to a first level;

a second level terminal, the second level terminal being connected to a second level;

the transfer gate circuit comprises:

a third inverter, an input terminal of the third inverter being connected to the output terminal of the buffer module, and an output terminal of the third inverter being connected to a gate of a seventh transistor, the seventh transistor, a first electrode of the seventh transistor being connected to the second level terminal, and a second electrode of the seventh transistor being connected to the output terminal of the amplitude control module; and an eighth transistor, a first electrode of the eighth transistor being connected to the second level terminal, a gate of the eighth transistor being connected to the output terminal of the buffer module, and a second electrode of the eighth transistor being connected to the output terminal of the amplitude control module; and a ninth transistor, a gate of the ninth transistor being connected to the output terminal of the third inverter, a first electrode of the ninth transistor being connected to the first level terminal, and a second electrode of the ninth transistor being connected to the output terminal of the amplitude control module; and a tenth transistor, a first electrode of the tenth transistor being connected to the first level terminal, a gate of the tenth transistor being connected to the output terminal of the buffer module, and a second electrode of the tenth transistor being connected to the output terminal of the amplitude control module.

Optionally, the amplitude control module pulls up an amplitude of a signal outputted by the buffer module according to the first level and pulls down an amplitude of a signal outputted by the buffer module according to the second level, so as to generate a touch time-shared driving signal, and output the touch time-shared driving signal to the touch emitting electrode.

An aspect of the embodiments of the present disclosure provides a touch driving circuit, comprising multiple stages of any of the touch driving unit provided above, wherein except the touch driving unit in a first stage, the start signal terminal of the shift control module of each remaining touch driving unit is connected to the output terminal of the shift control module in the touch driving unit in an adjacently previous stage; and except the touch driving unit in a last stage, the output terminal of the shift control module of each remaining touch driving unit is connected to the start signal terminal of the shift control module of the touch driving unit in an adjacently next stage.

An aspect of the embodiments of the present disclosure provides a display panel, comprising a gate driving circuit and a touch driving circuit both of which are disposed in a non-display region, the touch driving circuit being the touch driving circuit as described above, wherein the touch driving circuit is disposed at an outer side of the gate driving circuit, and is driven by adopting the same clock signal as that for the gate driving circuit.

An aspect of the embodiments of the present disclosure provides a display device, comprising the display panel described above.

The embodiments of the present disclosure provide a touch driving unit and circuit, a display panel and a display device, wherein a shift control module, a selection module, a buffer module and an amplitude control module are comprised, and in a case where the touch control emitting electrode and the common electrode are shared, it is possible to output a touch time-shared driving signal and a common voltage VOCOM of the common electrode to the touch emitting electrode layer of the touch display panel that is driven in a time-shared way, and since the touch driving circuit can be fabricated in the non-display region of the display panel, thus fabricating customized touch driving circuit of the TX in the prior art can be avoided, and it is beneficial to implement border sliming of the display panel, meanwhile, since the touch driving circuit is fabricated during the process of fabricating the display panel, it can ensure a product yield rate, and thereby effective cost control over the products can be achieved.

BRIEF DESCRIPTION OF THE DRAWINGS

In order to more clearly illustrate the technical solutions in the embodiments of the present disclosure or the technical solutions in the prior art, drawings necessary for describing the embodiments or the prior art will be briefly introduced below, obviously, the following drawings are parts of embodiments of the present disclosure, and for those of ordinary skill in the art, it is possible to obtain other drawings based on these drawings without paying creative efforts.

DETAILED DESCRIPTION OF THE EMBODIMENTS

Hereinafter, the technical solutions in the embodiments of the present disclosure will be described clearly and comprehensively in combination with the drawings in the embodiments of the present disclosure. Obviously, the described embodiments are only parts of the embodiments of the present disclosure, rather than all of the embodiments thereof. All the other embodiments obtained by those of ordinary skill in the art based on the embodiments of the present disclosure without paying creative efforts fall into the protection scope of the present disclosure.

Transistors adopted in all of the embodiments of the present disclosure may be a thin film transistor or an FET (Field Effect Transistor), or other devices of the same properties, since a source and a drain of the transistors adopted here are symmetrical, the source and the drain of these transistors may be interchanged. In the embodiments of the present disclosure, in order to distinguish the two electrodes other than the gate, one terminal is referred to as a source, and the other terminal is referred to as a drain. In addition, the transistors adopted by the embodiments of the present disclosure include a P-type transistor and an N-type transistor.

Figure 1:
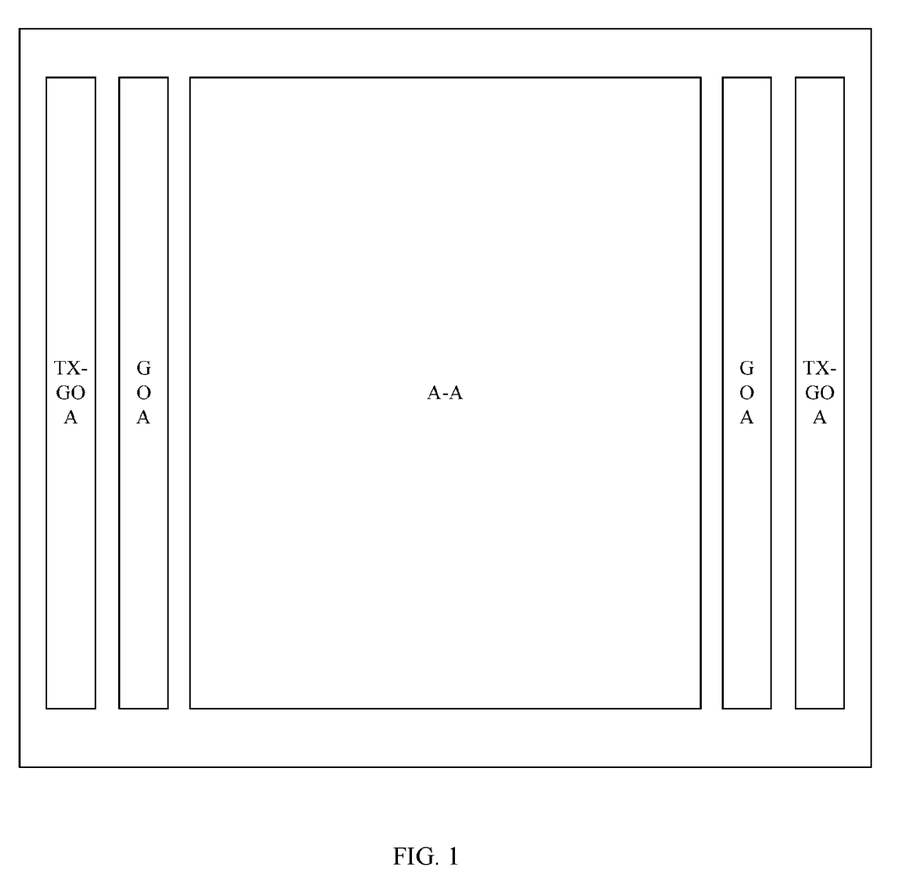
FIG. 1 is a schematic diagram of structure of a display panel provided by an embodiment of the present disclosure.

Referring to FIG. 1, an embodiment of the present disclosure provides a display panel that comprises a gate driving circuit GOA and a touch driving circuit TX-GOA both of which are disposed in a non-display region, the touch driving circuit TX-GOA is disposed at an outer side of the gate driving circuit GOA, and is driven by adopting the same clock signal as that for the gate driving circuit GOA.

As shown in FIG. 1, the display panel includes a display region A-A and a non-display region other than the display region A-A, wherein FIG. 1 merely shows positional relationship between the gate driving circuit GOA and the touch driving circuit TX-GOA, this figure illustration provides an example of driving from two sides, of course, in a technical solution of driving from one side, it is also possible to include only the gate driving circuit GOA and the touch driving circuit TX-GOA at a left side or a right side of the display region A-A in the figure illustration, or the gate driving circuit GOA and the touch driving circuit TX-GOA may be disposed at two sides of the display region A-A, separately; in addition, the following are also comprised on a display panel according to the prior art: an ESD (Electro-Static Discharge) module, a buffer (i.e., a storage capacitor), a COG (Chip On Glass), and an FPC (Flexible Printed Circuit) for outputting a signal from the display panel, these structures are not shown in the attached drawings, however, as will be appreciated, implementation of this solution may comprise these structures.

In the display panel provided by the embodiment of the present disclosure, since the touch driving circuit can be fabricated in the non-display region of the display panel, thus fabricating customized touch driving circuit of the TX in the prior art can be avoided, and it is beneficial to implement border sliming of the display panel, meanwhile, since the touch driving circuit is fabricated during the process of fabricating the display panel, it can ensure a product yield rate, and thereby effective cost control over the products can be achieved.

Figure 2:
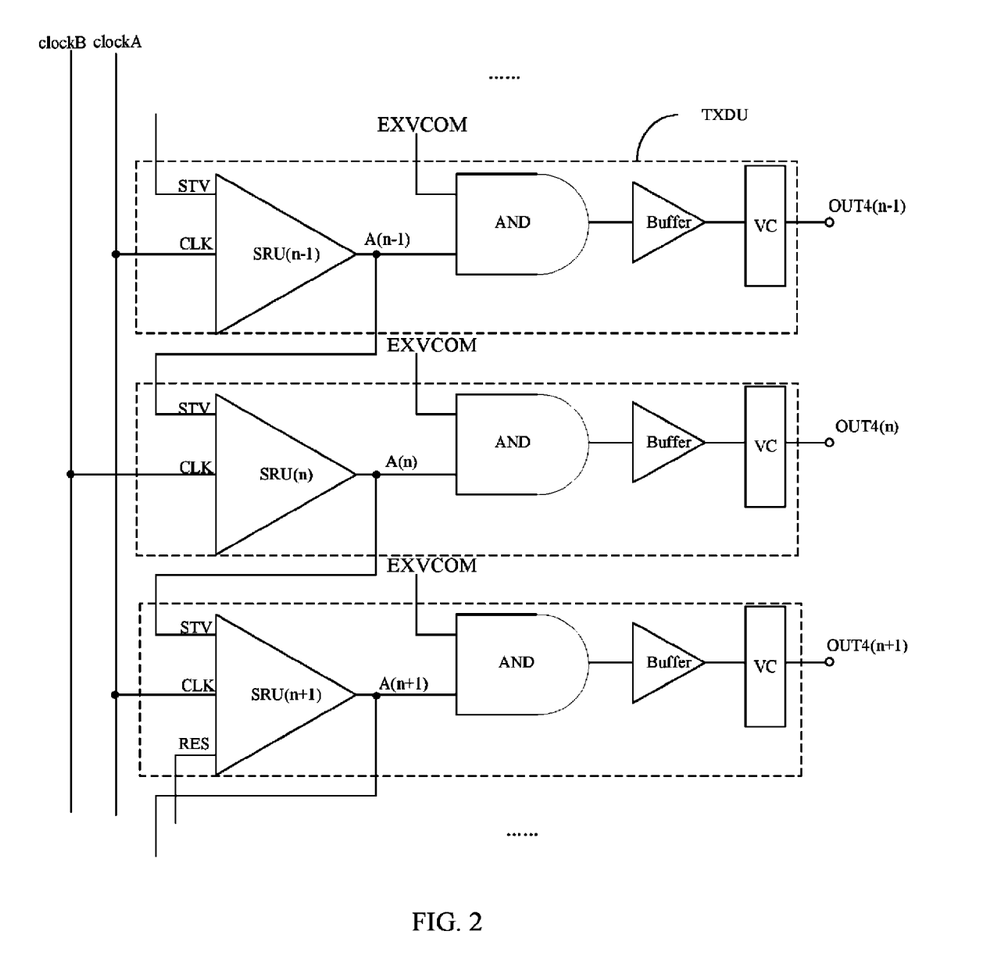
FIG. 2 is a schematic diagram of structure of a touch driving circuit provided by an embodiment of the present disclosure.

Referring to FIG. 2, an embodiment of the present disclosure provides a touch driving circuit applied to the display panel described above, and the touch driving circuit comprises multiple stages of the touch driving unit TXDU.

Figure 3:
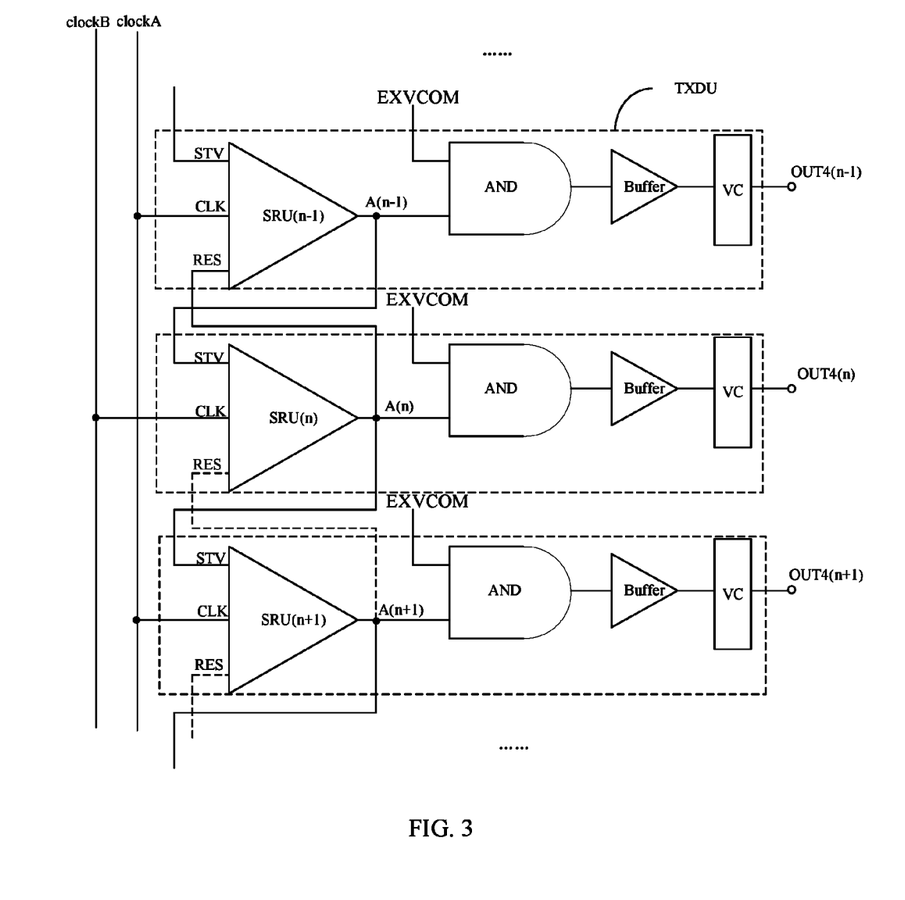
FIG. 3 is a schematic diagram of structure of a touch driving circuit provided by another embodiment of the present disclosure.
Figure 4:
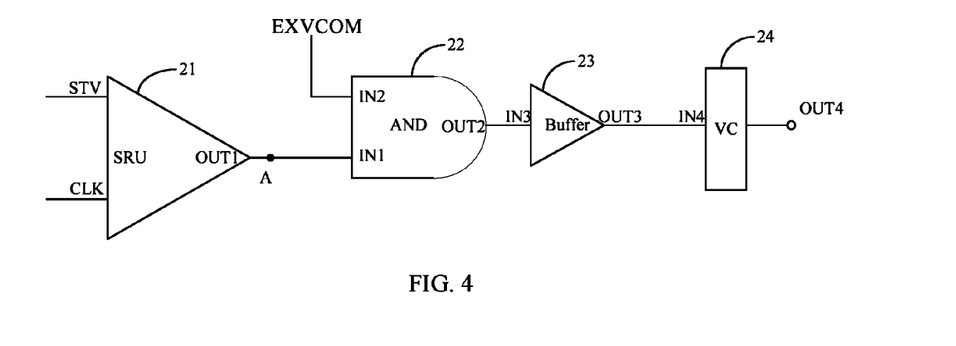
FIG. 4 is a schematic diagram of structure of a touch driving unit provided by an embodiment of the present disclosure.

As shown in FIG. 4, the touch driving unit TXDU comprises a shift control module (SRU) 21, a selection module (AND) 22, a buffer module (Buffer) 23 and an amplitude control module (VC) 24. The shift control module 21 includes a start signal terminal STV, an output terminal OUT1 and at least one clock signal terminal CLK. The selection module 22 includes a first input terminal IN1, a second input terminal IN2 and an output terminal OUT2. The buffer module 23 includes an input terminal IN3 and an output terminal OUT3. The amplitude control module 24 includes an input terminal IN4 and an output terminal OUT4. The output terminal OUT1 of the shift control module 21 is connected to the first input terminal IN1 of the selection module 22. The second input terminal IN2 of the selection module 22 is inputted with a touch time-shared control signal EXVCOM, the output terminal OUT2 of the selection module 22 is connected to the input terminal IN3 of the buffer module 23. The output terminal OUT3 of the buffer module 23 is connected to the input terminal IN4 of the amplitude control module 24. The output terminal OUT4 of the amplitude control module 24 is connected to a touch emitting electrode TX. The shift control module 21 may be a shift register. FIGS. 2 and 3 exemplarily provide a solution of controlling through two system clocks, clock A and clock B, wherein the clock A controls the shift register in an odd-numbered row and the clock B controls the shift register in an even-numbered row. Alternatively, the clock A controls the shift register in an even-numbered row and the clock B controls the shift register in an odd-numbered row. Phases of the clock A and the clock B are opposite. Each shift register described above may be controlled through one clock signal, or each shift register described above may be a shift register that is controlled through two or more system clocks, that is, the present disclosure makes no limitation to the specific number of the shift register, so long as that the shift register unit is any shift register capable of implementing the technical solution of the present disclosure.

As shown in FIG. 2, except the touch driving unit in a first stage, the start signal terminal of the shift control module of each remaining touch driving unit is connected to the output terminal of the shift control module in the touch driving unit in an adjacently previous stage; and except the touch driving unit in a last stage, the output terminal of the shift control module of each remaining touch driving unit is connected to the start signal terminal of the shift control module of the touch driving unit in an adjacently next stage.

Referring to FIG. 3, the shift control module (SRU) 21 may further include a reset signal terminal RES configured to reset a signal at the output terminal OUT1 thereof, so as to avoid occurrence of multi-output. Of course, as shown in FIG. 3, when an (n−1)-th stage is the touch driving unit to which the first row of pixels corresponds, it is possible to set the reset signal terminal RES only in the shift control module (SRU) 21 in the touch driving unit TXDU to which the first row of pixels corresponds; of course, the reset signal terminal RES may also be set in the shift control module (SRU) 21 in the touch driving unit TXDU to which the subsequent rows of pixels correspond. In this case, the reset signal terminal of the shift control module in each touch driving unit is connected to the output terminal of the shift control module in the touch driving unit in an adjacently next stage.

FIG. 2 shows the touch driving unit to which the TX in the (n−1)-th row, the n-th row and the (n+1)-th row correspond. The touch control unit in the first stage (i.e., the touch control unit to which the TX in the first row corresponds) inputs STV (a scan start signal).

Figure 5:
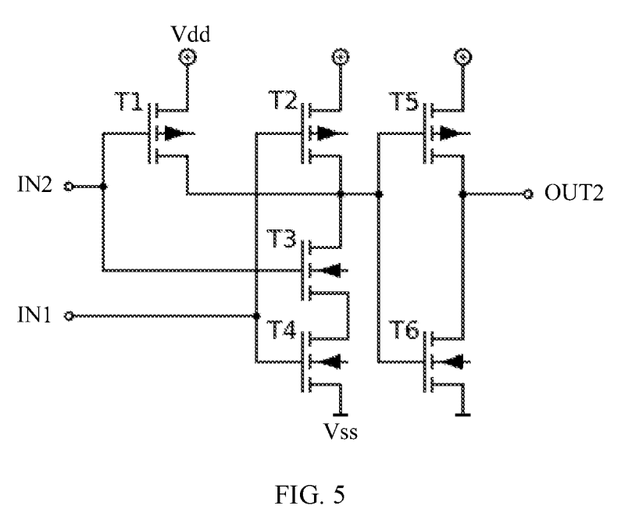
FIG. 5 is a schematic diagram of structure of a selection module provided by another embodiment of the present disclosure.

Optionally, the selection module 22 comprises an AND gate circuit. Exemplarily, as shown in FIG. 5, there is provided an AND gate circuit, the AND gate circuit comprises:

a first transistor T1, a first electrode of the first transistor T1 being connected to a voltage terminal vdd, a gate of the first transistor T1 being inputted with the touch time-shared control signal, and a second electrode of the first transistor being connected to a gate of a fifth transistor T5;

a third transistor T3, a first electrode of the third transistor T3 being connected to the second electrode of the first transistor T1, a gate of the third transistor T3 being inputted with the touch time-shared control signal, and a second electrode of the third transistor T3 being connected to a first electrode of a fourth transistor T4;

the fourth transistor T4, a gate of the fourth transistor T4 being connected to the output terminal OUT1 of the shift control module 21, and a second electrode of the fourth transistor T4 being grounded, i.e., being connected to Vss;

a second transistor T2, a first electrode of the second transistor T2 being connected to the voltage terminal Vdd, a gate of the second transistor T2 being connected to the gate of the fourth transistor T4, and a second electrode of the second transistor T2 being connected to the first electrode of the third transistor T3;

the fifth transistor T5, a first electrode of the fifth transistor T5 being connected to the voltage terminal Vdd, a gate of the fifth transistor T5 being connected to a gate of a sixth transistor T6, and a second electrode of the fifth transistor T5 being connected to the output terminal OUT2 of the selection module 22; and the sixth transistor T6, a first electrode of the sixth transistor T6 being connected to the second electrode of the fifth transistor T5, a second electrode of the sixth transistor T6 being grounded, i.e., being connected to Vss, and the gate of the sixth transistor T6 being connected to the second electrodes of the first transistor T1 and the second transistor T2.

Further, in the AND gate circuit provided in FIG. 5, the first transistor T1, the second transistor T2 and the fifth transistor T5 belong to the same type of transistor, for example, each of them is a P-type transistor; the third transistor T3, the fourth transistor T4 and the sixth transistor T6 belong to the same type of transistor, for example, each of them is an N-type transistor.

Figure 6:
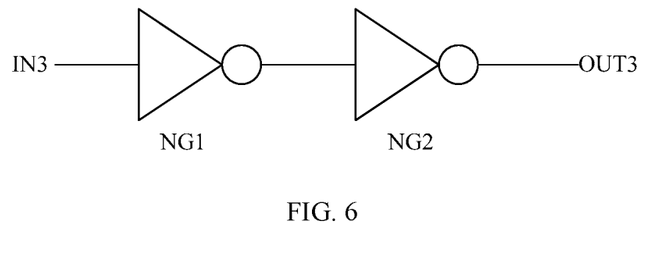
FIG. 6 is a schematic diagram of structure of a buffer module provided by an embodiment of the present disclosure.

Optimally, referring to FIG. 6, the buffer module 23 comprises a first inverter NG1 and a second inverter NG2, wherein an input terminal IN3 of the first inverter NG1 is connected to the output terminal OUT2 of the selection module 22, and an output terminal of the first inverter NG1 is connected to an input terminal of the second inverter NG2; and an output terminal OUT3 of the second inverter NG2 is connected to the input terminal IN4 of the amplitude control module 24.

Figure 7:
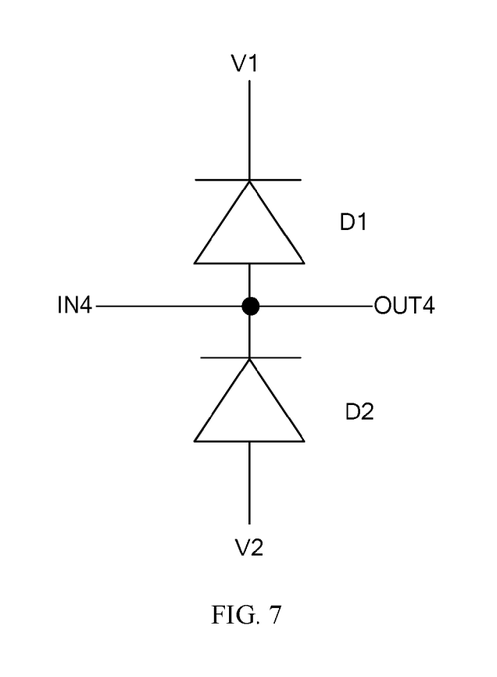
FIG. 7 is a schematic diagram of structure of an amplitude control module provided by an embodiment of the present disclosure.

Optionally, referring to FIG. 7, the amplitude control module 24 comprises:

a first level terminal V1, the first level terminal V1 being connected to a first level; a second level terminal V2, the second level terminal V2 being connected to a second level; a first diode D1, a cathode of the first diode D1 being connected to the first level terminal V1, and an anode of the first diode D1 being connected to the output terminal OUT of the buffer module 23; and a second diode D2, an anode of the second diode D2 being connected to the second level terminal V2, and a cathode of the second diode D2 being connected to the output terminal OUT3 of the buffer module 23.

Figure 8:
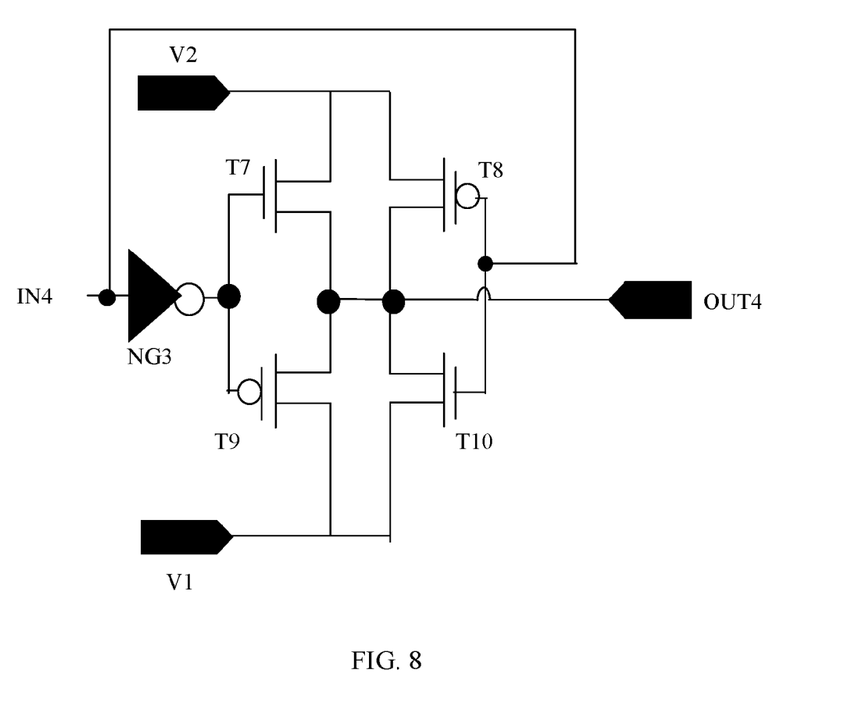
FIG. 8 is a schematic diagram of structure of an amplitude control module provided by another embodiment of the present disclosure.

Optionally, there is provided another implementation solution, referring to FIG. 8, the amplitude control module comprises a transfer gate circuit. Exemplarily, the amplitude control module 24 comprises: a first level terminal V1, the first level terminal V1 being connected to a first level; a second level terminal V2, the second level terminal V2 being connected to a second level. The transfer gate circuit comprises:

a third inverter NG3, an input terminal of the third inverter NG3 being connected to the output terminal OUT3 of the buffer module 23, and an output terminal NG3 of the third inverter being connected to a gate of a seventh transistor T7, the seventh transistor T7, a first electrode of the seventh transistor T7 being connected to the second level terminal V2, and a second electrode of the seventh transistor T7 being connected to the output terminal OUT4 of the amplitude control module 24; and an eighth transistor T8, a first electrode of the eighth transistor T8 being connected to the second level terminal V2, a gate of the eighth transistor T8 being connected to the output terminal OUT3 of the buffer module 23, and a second electrode of the eighth transistor T8 being connected to the output terminal OUT4 of the amplitude control module 24; and a ninth transistor T9, a gate of the ninth transistor being connected to the output terminal of the third inverter NG3, a first electrode of the ninth transistor T9 being connected to the first level terminal V1, and a second electrode of the ninth transistor T9 being connected to the output terminal OUT4 of the amplitude control module 24; and a tenth transistor T10, a first electrode of the tenth transistor being connected to the first level terminal V1, a gate of the tenth transistor T10 being connected to the output terminal OUT3 of the buffer module 23, and a second electrode of the tenth transistor T10 being connected to the output terminal OUT4 of the amplitude control module 24.

Referring back to FIG. 4, as to each touch driving unit TXDU, the shift control module 21 is configured to generate, at the output terminal OUT1 thereof, a shift register signal under the control of the start signal terminal STV and the at least one clock signal terminal CLK;

the selection module 22 is configured to output a high level signal VGH or a low level signal VGL in accordance with a combined action of the touch time-shared control signal EXVCOM and the shift register signal generated by the shift control module 12;

the buffer module 23 is configured to convert a level of a signal outputted by the selection module 22 to a level equal to a control signal at the input terminal of the amplitude control module 24; and the amplitude control module 24 is configured to pull up or pull down an amplitude of a signal outputted by the buffer module 23, to generate a touch time-shared driving signal, and output the touch time-shared driving signal to the touch emitting electrode TX. For example, the amplitude control module 24 pulls up the amplitude of the signal outputted by the buffer module 23 in accordance with the first level at the first level terminal V1, and pulls down the amplitude of the signal outputted by the buffer module 23 in accordance with the second level at the second level terminal V2, to generate the touch time-shared driving signal, and output the touch time-shared driving signal to the touch emitting electrode TX.

Figure 9:
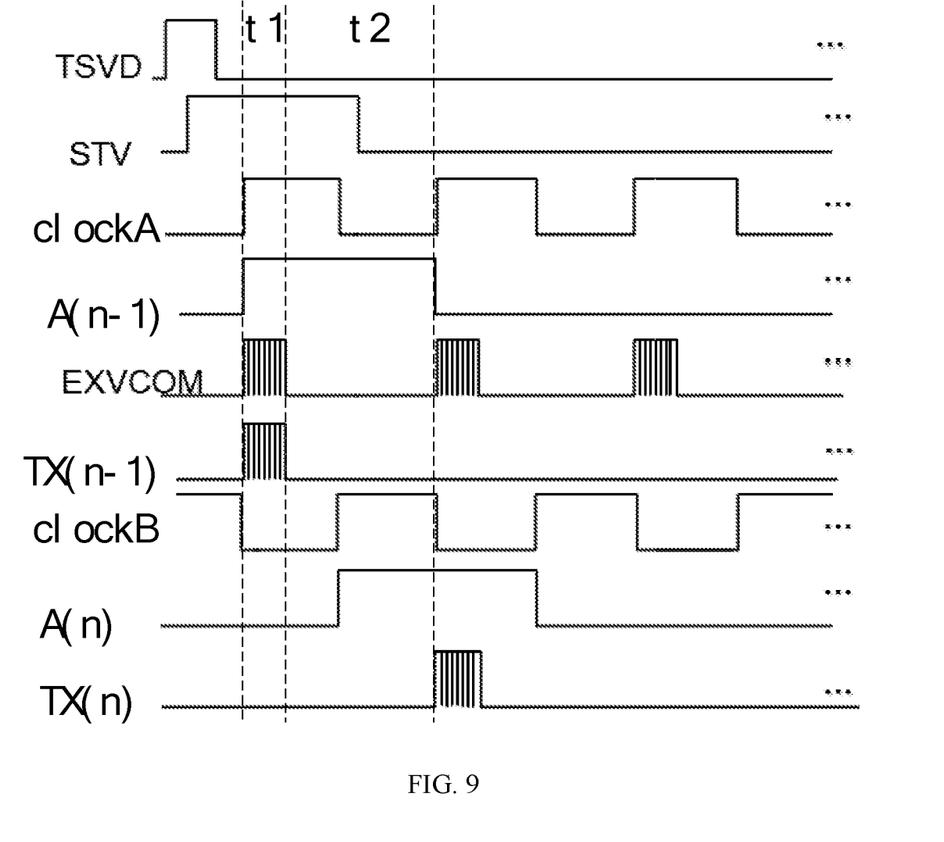
FIG. 9 is a schematic diagram of a timing status of a driving signal of a touch driving circuit provided by an embodiment of the present disclosure.

As shown in the timing status diagram in FIG. 9, in the Hybrid In cell technique, since the TX (the touch emitting electrode) layer and the common electrode layer of the display panel are shared, thus in a touch phase, it needs to output the touch time-shared driving signal to the TX (the touch emitting electrode) layer or the common electrode of the display panel by means of the circuit provided by the present application, so as to meet touch and display requirements when the TX (the touch emitting electrode) layer and the common electrode layer of the display panel are shared. Illustration is provided with the first level terminal V1 being a high level VCOMHI and the second level terminal V2 being a low level VCOMLOW as example. In a time length of one STV signal, a touch period t1 and a display period t2 are included; after one frame scanning signal TSVD, the scan start signal STV is inputted into the touch driving unit in the first stage, referring to the circuit shown in FIG. 2, if the (n−1)-th row is the first row, then under the control of the clock A, the shift control module (SRU (n−1)) 21 outputs the shift register signal at a node A (n−1) from a start moment of the period t1 to an end moment of the period t2, wherein the shift register signal in FIG. 9 is a high level signal; the touch time-shared control signal EXVCOM is a period signal, within one period, a high level is outputted within the period t1 and a low level is outputted within the period t2; the selection module (AND) 22 performs an AND operation on the touch time-shared control signal EXVCOM and the shift register signal generated by the shift register module 21, and outputs an operation result to the amplitude control module 24 through the buffer module 23, the high level signal or the low level signal generated from the operation result of the selection module (AND) 22 has its driving capability being strengthened after passing through the buffer module 23, the amplitude control module 24 pulls up the input signal to the high level VCOMHI at the first level terminal or pulls down the low level VCOMLOW at the second level terminal, wherein it can be known by referring to the timing of TX(n−1) in FIG. 9 that, during the period t1, the amplitude control module 24 outputs the high level VCOMHI of the first level terminal to the touch emitting electrode TX, so that a touch function is achieved in this period; during the period t2, the amplitude control module 24 outputs the low level VCOMLOW (i.e., the common voltage VCOM of the common electrode layer) of the second level terminal to the touch emitting electrode TX, so that a display function is achieved in this period. In the above embodiment, the low level VCOMLOW of the second level terminal, the grounding Vss, and the low level may be the same zero potential or a negative voltage, wherein a signal at the node A(n−1) also serves as an input signal STV of the shift control module (SRU(n)) 21 to which a next row corresponds, so as to trigger the circuit in a next row (the n-th row) to start working, its operating principles are the same as those of the (n−1)-th row, FIG. 9 provides the node A(n) in the n-th circuit and a signal timing of TX(n), details are no more repeated herein.

The touch driving unit and circuit provided by the embodiments of the present disclosure comprise a shift control module, a selection module, a buffer module and an amplitude control module, and it is possible to output a touch time-shared driving signal and a common voltage VOCOM of the common electrode to the touch emitting electrode layer of the touch display panel that is driven in a time-shared way in a case where the touch control emitting electrode and the common electrode are shared, and since the touch driving circuit can be fabricated in the non-display region of the display panel, thus fabricating customized touch driving circuit of the TX in the prior art can be avoided, and it is beneficial to implement border sliming of the display panel, meanwhile, since the touch driving circuit is fabricated during the process of fabricating the display panel, it can ensure a product yield rate, and thereby effective cost control over the products can be achieved.

An embodiment of the present disclosure provides a display device, comprising any of the display circuit described above. The display circuit comprises a pixel unit, a first gate driving unit and a second gate driving unit. The display device may be electrode paper, mobile phone, television, digital framing, or other display devices.

The above described merely are specific implementations of the present disclosure, but the protection scope of the present disclosure is not limited thereto, modification and replacements easily conceivable for those skilled in the art within the technical range revealed by the present disclosure all fall into the protection scope of the present disclosure. Therefore, the protection scope of the present disclosure is subjected to the protection scope of the claims.

The present disclosure claims priority right of Chinese Patent Application No. 201510182106.2 filed on Apr. 16, 2015, the disclosure of which is incorporated in entirety herein by reference as a portion of the present application.

What is claimed:

1. A touch driving unit comprising:
a shift control subcircuit, a selection subcircuit, a buffer subcircuit and an amplitude control subcircuit; the shift control subcircuit including a start signal terminal, an output terminal and at least one clock signal terminal; the selection subcircuit including a first input terminal, a second input terminal and an output terminal; the buffer subcircuit including an input terminal and an output terminal; the amplitude control subcircuit including an input terminal and an output terminal;
wherein the output terminal of the shift control subcircuit is connected to the first input terminal of the selection subcircuit; the second input terminal of the selection subcircuit is inputted with a touch time-shared control signal, the output terminal of the selection subcircuit is connected to the input terminal of the buffer subcircuit, the output terminal of the buffer subcircuit is connected to the input terminal of the amplitude control subcircuit; the output terminal of the amplitude control subcircuit is connected to a touch emitting electrode;
the shift control subcircuit is configured to generate, at the output terminal thereof, a shift register signal under the control of the start signal terminal and the at least one clock signal terminal;
the selection subcircuit is configured to output a high level signal or a low level signal in accordance with a combined action of the touch time-shared control signal and the shift register signal generated by the shift control subcircuit;
the buffer subcircuit is configured to convert a level of a signal outputted by the selection subcircuit to a level equal to a control signal at the input terminal of the amplitude control subcircuit; and
the amplitude control subcircuit is configured to pull up or pull down an amplitude of a signal outputted by the buffer subcircuit, to generate a touch time-shared driving signal and a display control signal in a time-shared manner, and output the touch time-shared driving signal to the touch emitting electrode so as to achieve a touch function, and output the display control signal to the touch emitting electrode so as to achieve a display function, wherein the amplitude control subcircuit comprises a transfer gate circuit, wherein the amplitude control subcircuit comprises:

a first level terminal, the first level terminal being connected to a first level;

a second level terminal, the second level terminal being connected to a second level;

the transfer gate circuit comprises:

a third inverter, an input terminal of the third inverter being connected to the output terminal of the buffer subcircuit, and an output terminal of the third inverter being connected to a gate of a seventh transistor, the seventh transistor, a first electrode of the seventh transistor being connected to the second level terminal, and a second electrode of the seventh transistor being connected to the output terminal of the amplitude control subcircuit; and an eighth transistor, a first electrode of the eighth transistor being connected to the second level terminal, a gate of the eighth transistor being connected to the output terminal of the buffer subcircuit, and a second electrode of the eighth transistor being connected to the output terminal of the amplitude control subcircuit; and a ninth transistor, a gate of the ninth transistor being connected to the output terminal of the third inverter, a first electrode of the ninth transistor being connected to the first level terminal, and a second electrode of the ninth transistor being connected to the output terminal of the amplitude control subcircuit; and a tenth transistor, a first electrode of the tenth transistor being connected to the first level terminal, a gate of the tenth transistor being connected to the output terminal of the buffer subcircuit, and a second electrode of the tenth transistor being connected to the output terminal of the amplitude control subcircuit.

2. The touch driving unit according to claim 1, wherein the selection subcircuit comprises an AND gate circuit.

3. The touch driving unit according to claim 2, wherein the AND gate circuit comprises:

a first transistor, a first electrode of the first transistor being connected to a voltage terminal, a gate of the first transistor being inputted with the touch time-shared control signal, and a second electrode of the first transistor being connected to a gate of a fifth transistor;

a third transistor, a first electrode of the third transistor being connected to the second electrode of the first transistor, a gate of the third transistor being inputted with the touch time-shared control signal, and a second electrode of the third transistor being connected to a first electrode of a fourth transistor;

the fourth transistor, a gate of the fourth transistor being connected to the output terminal of the shift control subcircuit, and a second electrode of the fourth transistor being grounded;

a second transistor, a first electrode of the second transistor being connected to the voltage terminal, a gate of the second transistor being connected to the gate of the fourth transistor, and a second electrode of the second transistor being connected to the first electrode of the third transistor;

the fifth transistor, a first electrode of the fifth transistor being connected to the voltage terminal, a gate of the fifth transistor being connected to a gate of a sixth transistor, and a second electrode of the fifth transistor being connected to the output terminal of the selection subcircuit; and the sixth transistor, a first electrode of the sixth transistor being connected to the second electrode of the fifth transistor, and a second electrode of the sixth transistor being grounded.

4. The touch driving unit according to claim 3, wherein the first transistor, the second transistor and the fifth transistor belong to the same type of transistor; and the third transistor, the fourth transistor and the sixth transistor belong to the same type of transistor.

5. The touch driving unit according to claim 1, wherein the shift control subcircuit comprises a shift register.

6. The touch driving unit according to claim 1, wherein the buffer subcircuit comprises a first inverter and a second inverter:

an input terminal of the first inverter is connected to the output terminal of the selection subcircuit, and an output terminal of the first inverter is connected to an input terminal of the second inverter; and an output terminal of the second inverter is connected to the input terminal of the amplitude control subcircuit.

7. The touch driving unit according to claim 1, wherein the amplitude control subcircuit pulls up an amplitude of a signal outputted by the buffer subcircuit according to the first level and pulls down an amplitude of a signal outputted by the buffer subcircuit according to the second level, so as to generate a touch time-shared driving signal, and output the touch time-shared driving signal to the touch emitting electrode.

8. A touch driving circuit, comprising multiple stages of the touch driving unit according to claim 1, wherein, except for the touch driving unit in a first stage, the start signal terminal of the shift control subcircuit of each remaining touch driving unit is connected to the output terminal of the shift control subcircuit in the touch driving unit in an adjacently previous stage; and except for the touch driving unit in a last stage, the output terminal of the shift control subcircuit of each remaining touch driving unit is connected to the start signal terminal of the shift control subcircuit of the touch driving unit in an adjacently next stage.

9. A display panel, comprising a gate driving circuit and a touch driving circuit, both of which are disposed in a non-display region, the touch driving circuit being the touch driving circuit according to claim 8, wherein the touch driving circuit is disposed at an outer side of the gate driving circuit, and is driven by adopting the same clock signal as that for the gate driving circuit.

10. A display device, comprising the display panel according to claim 9.

* * * * *